US006129893A

United States Patent [19]

Bolton et al.

[11] Patent Number: 6,129,893

[45] Date of Patent: Oct. 10, 2000

[54] **METHOD FOR PREVENTING REPLICATION IN *CRYPTOSPORIDIUM PARVUM* USING ULTRAVIOLET LIGHT**

[75] Inventors: James R. Bolton, Ontario, Canada; R. D. Samuel Stevens, Moon Township, Allegheny County, Pa.

[73] Assignee: Calgon Carbon Corporation

[21] Appl. No.: 09/078,116

[22] Filed: May 13, 1998

[51] Int. Cl.$^{7}$ .................................................. C02F 1/32

[52] U.S. Cl. ............................... 422/23; 422/24; 210/748

[58] Field of Search ................................ 422/22, 24, 23, 422/186, 186.3; 210/748

[56] References Cited

U.S. PATENT DOCUMENTS 5,900,211 5/1999 Dunn et al. ............................... 422/24

FOREIGN PATENT DOCUMENTS 2292097 2/1996 United Kingdom .
WO 97/15332 5/1997 WIPO .

OTHER PUBLICATIONS

E.L. Jarol, "Effect of disinfectants on Giardia cysts," CRC Critical Reviews in Environmental Contro.l, 1988, 18, 1–28.
M.J. Lorenzo–Lorenzo, M.E. Area–Mazea, I. Villacorta–Martinez de Maturana and Duran–Oreiro, "Effect of Ultraviolet Disinfection of Drinking Water on Viability of *Crytosporidium parvum* Oocysts," J. Parasitol, 1993, 79(1), 67–70.

A. Bushnell, W. Clark, J. Dunn and K. Salisbury, "Pulsed Light Sterilization of Products Packaged by Blow–Fill–Seal Techniques," Pharm. Engin. 1997, Set/Oct., 74–83.

R. LaFrenz, "High Intensity Pulsed UV for Drinking Water Treatment," Proc. AWWA WQT Conference, Denver, CO, Nov., 1997.

"Inactivation of Oocysts of *Cryptosporidium parvum* by Ultraviolet Irradiation" Wat. Res., vol. 29, No. 11, pp. 2583–2586 (1995) Authors: A.T. Campbell, L.J. Robertson, M.R. Snowball and H.V. Smith.

"Ultraviolet Sterilization" Handbook of Water Purification, second edition, Ellis Horwood Series in Water and Wastewater Technology, author: Gunther O. Schenk.

Water Supply, vol. 11, Amsterdam, pp. 103–118, 1993 entitled: "Effects of Disinfectants on the Viability of *Cryptosporidium parvun* Oocysts" authors: M.E. Ransome, T.N. Whitmore and E.G. Carrington.

*Primary Examiner*—Elizabeth McKane
*Attorney, Agent, or Firm*—Cohen & Grigsby, P.C.

[57] ABSTRACT

A method for prevention of cryptosporidium oocysts and similar organisms in water by irradiating the water with ultraviolet light in a range of 200 to 300 nm in doses of about 10 mJ/cm$^2$ to 175 mJ/cm$^2$.

4 Claims, 2 Drawing Sheets

METHOD FOR PREVENTING REPLICATION IN *CRYPTOSPORIDIUM PARVUM* USING ULTRAVIOLET LIGHT

FIELD OF THE INVENITON

The present invention relates to a method for preventing the replication of Cryptosporidium Parvum in water and in particular to a method for the prevention of cryptosporidium oocyst and similar organism infections in water using low levels of ultraviolet light.

BACKGROUND OF THE INVENTION

It has been generally well recognized that it is necessary to kill or inactivate xx oocysts so that they do not infect. This is especially important in drinking water. One such method is the use of ultraviolet ("UV") light. The prior art teaches that a UV dose of at least 3000 mJ/cm$^2$ is required to inactivate *Cryptosporidium parvum* (Lorenzo-Lorenzo et al., J. Parasitol. 1993, 79, 67–70) and *Giardia muris* (E. L. Jarol, "Effect of disinfectants on *Giardia cysts*", CRC Critical Reviews in Environmental Control, 1988, 18, 1–28.). Snowball and coworkers (UK Patent Application #9416287.2, Nov. 8, 1984; *Wat. Res.,* 1995, 29, 2583–2586) developed an apparatus that first filtered out *Cryptosporidium oocysts* and then exposed them to UV doses of 350–400 mJ/cm$^2$. The patent teaches the use of membrane filters to trap *Crysptosporidium oocysts* which is then irradiated with a bank of low pressure Hg lamps for a UV dose of 350–400 mJ/cm$^2$. The filter is then backwashed onto a second filter and the irradiation is repeated. The patent discloses that the treatment "kills" the organisms.

M. J. Lorenzo-Lorenzo, M. E. Area-Mazea, I. Villacorta-Martinez de Maturana and D. Duran-Oreiro, "Effect of Ultraviolet Disinfection of Drinking Water on the Viability of *Cryptosporidium parvum* Oocysts", *J Parasitol.* 1993, 79(1), 67–70.The paper reports the prevention of infection in mice after exposure to at least 150 min of UV from a (presumably) low-pressure Hg lamp. Although the paper is not clear, it can be inferred that the UV dose applied was over 5000 mJ/cm$^2$ to obtain better than 2 logs reduction in infectivity. The authors claim that exposure to UV for 150 min or more "eliminates" infectivity, but they give no mechanism other than to say "UV radiation disrupts DNA by causing formation of th[y]amine dimers, and high levels may leads to cell death. At the UV doses they applied, almost certainly the effects observed were caused by cell death.

In a paper by A. Bushnell, W. Clark, J. Dunn and K. Salisbury, "Pulsed Light Sterilization of Products Packaged by Blow-Fill-Seal Techniques", *Pharm. Engin.* 1997, September/October, 74–83, a pulsed UV technique for "sterilizing" surfaces containing bacteria, fungi, spores, viruses, protozoa and oocysts is described. The required UV doses were reported to be over 1000 mJ/cm$^2$. The effectiveness of the method was assayed using mouse infectivity. At the reported UV doses, the effects were believed to be due to cell death.

In a paper by R. LaFrenz, "High Intensity Pulsed UV for Drinking Water Treatment", *Proc. AWWA WQT Conference,* Denver, Colo., November, 1997 a similar pulsed systems was described. While very few details were described, it appears that mouse infectivity assay was used and with a claimed 100% "inactivation" of Cryptosporidium to a level of 6 logs at energy levels of approximately 200 mJ/cm$^2$ and greater. The paper claims that the pulsed UV overcomes the "DNA repair mechanism"; however, the UV doses applied are much larger than required with a steady-state medium pressure Hg lamp.

Accordingly, it is an object of the invention to provide a method to treat water in an effective way to so that *Cryptosporidium oocysts* cannot infect. It is another object of the invention to provide a method using ultraviolet light to render the *crysptosporiduium oocysts* ineffective to infect. It is yet another object of the present invention to provide a method using ultraviolet light that is cost effective in treating drinking water to eliminate the potential for crysptosporiduium oocysts infection.

SUMMARY OF THE INVENTION

Generally it has been discovered that it is not necessary to "kill" or "inactivate" pathogens, such as *Cryptosporidium parvum* or *Giardia muris* with ultraviolet light in order to prevent infection; one need only apply enough ultraviolet light to prevent the organism from "replicating". The method of the present invention prevents replication (cell mitosis) by cross-linking the DNA to prevent infection. The UV doses required to prevent replication are orders of magnitude lower than required to "kill" or "inactivate" the oocysts. This means that the cost of UV treatment to prevent infection by *Cryptosporidium oocysts* will be markedly lower.

It has been found that when biological organisms are exposed to ultraviolet light (UV) in the range of 200–300 nm, the UV can be absorbed by DNA, RNA and proteins. Absorption by proteins can lead to rupture of cell walls and death of the organism. Absorption by DNA or RNA (specifically by thymine bases) is known to cause cross-linking of the DNA or RNA double helix strands through the formation of thymine dimers. If enough of these cross links are created in DNA, it cannot separate into two strands and hence in mitosis, the cell cannot replicate. Cells that cannot replicate cannot infect. The present invention utilizes UV doses substantially lower to achieve the state of hindered replication are much lower (by orders of magnitude) than those required to cause cell oocyst destruction.

The present invention utilizes a broadband (200–300 nm) medium pressure UV lamp to achieve the prevention. Medium pressure UV lamps provide a continuous ultraviolet spectrum. Medium pressure mercury lamps contain mercury vapor pressure of about 1000 Hg when they are energized (low pressure mercury lamps contain mercury vapor pressure of about 0.001 to about 10 mm Hg when they are energized). A. M. Braun, M. T. Maurette, and E. Oliveros; Photochemical Technology; pp. 109–114; John Wiley & Sons; 1991. The dose required can be as low as 10 mJ/cm$^2$. Doses over 30 mJ/cm$^2$ provide more than 4.5 logs removal measured by mouse infectivity. Thus, the dose levels are significantly lower than used before resulting in significantly lower power levels needed to achieve the results. Accordingly, the method provides a substantial increase in the cost effectiveness of UV reduction in cryptosporidium oocysts infection in drinking water. Other advantages will become apparent from a perusal of the following detailed description of a presently preferred embodiment of the invention.

PRESENTLY PREFERRED EMBODIMENT

Figure 1:
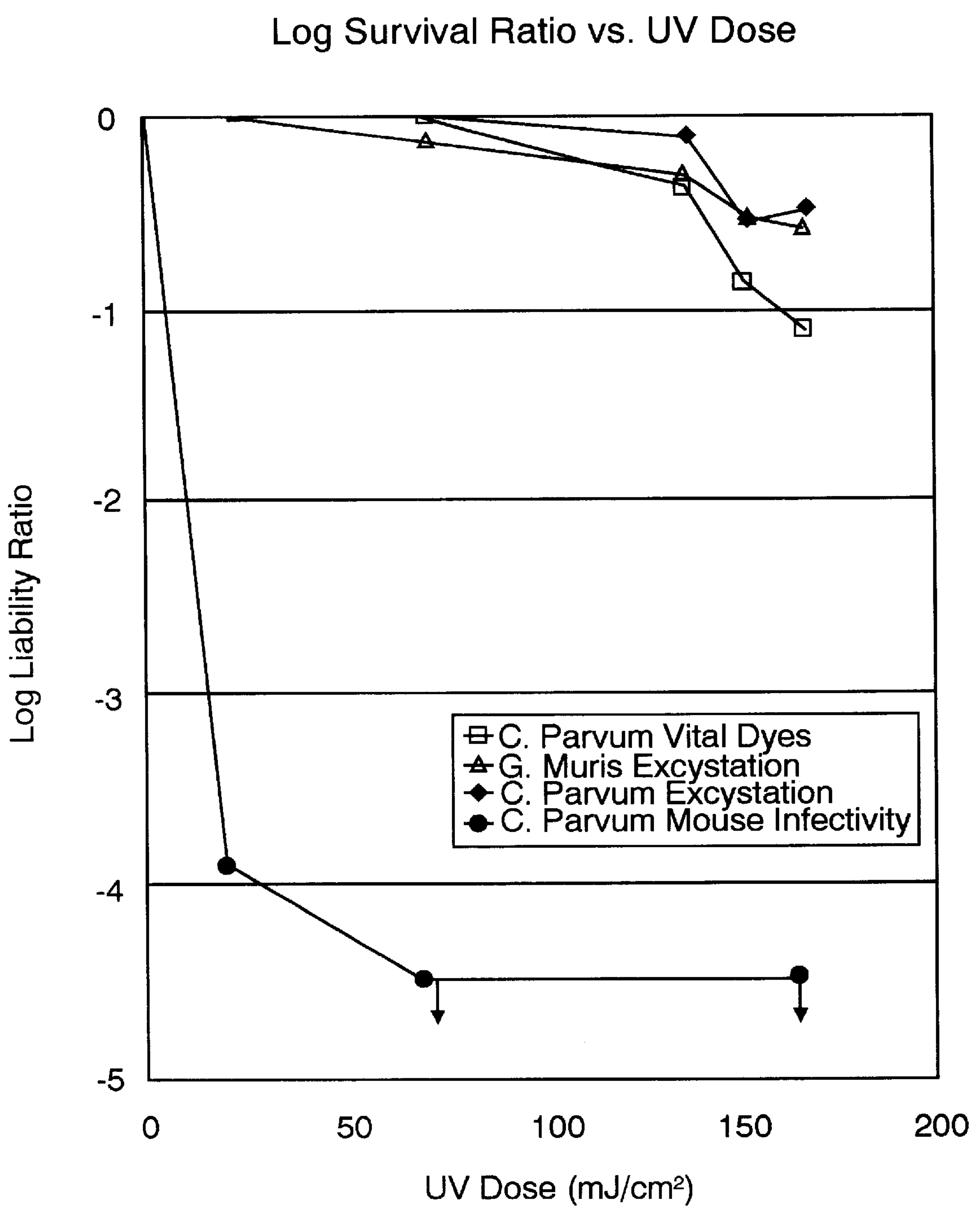
FIG. 1 is a chart showing the difference between the infectivity assay and the in vitro (excystation and vital dyes) assays.
Figure 2:
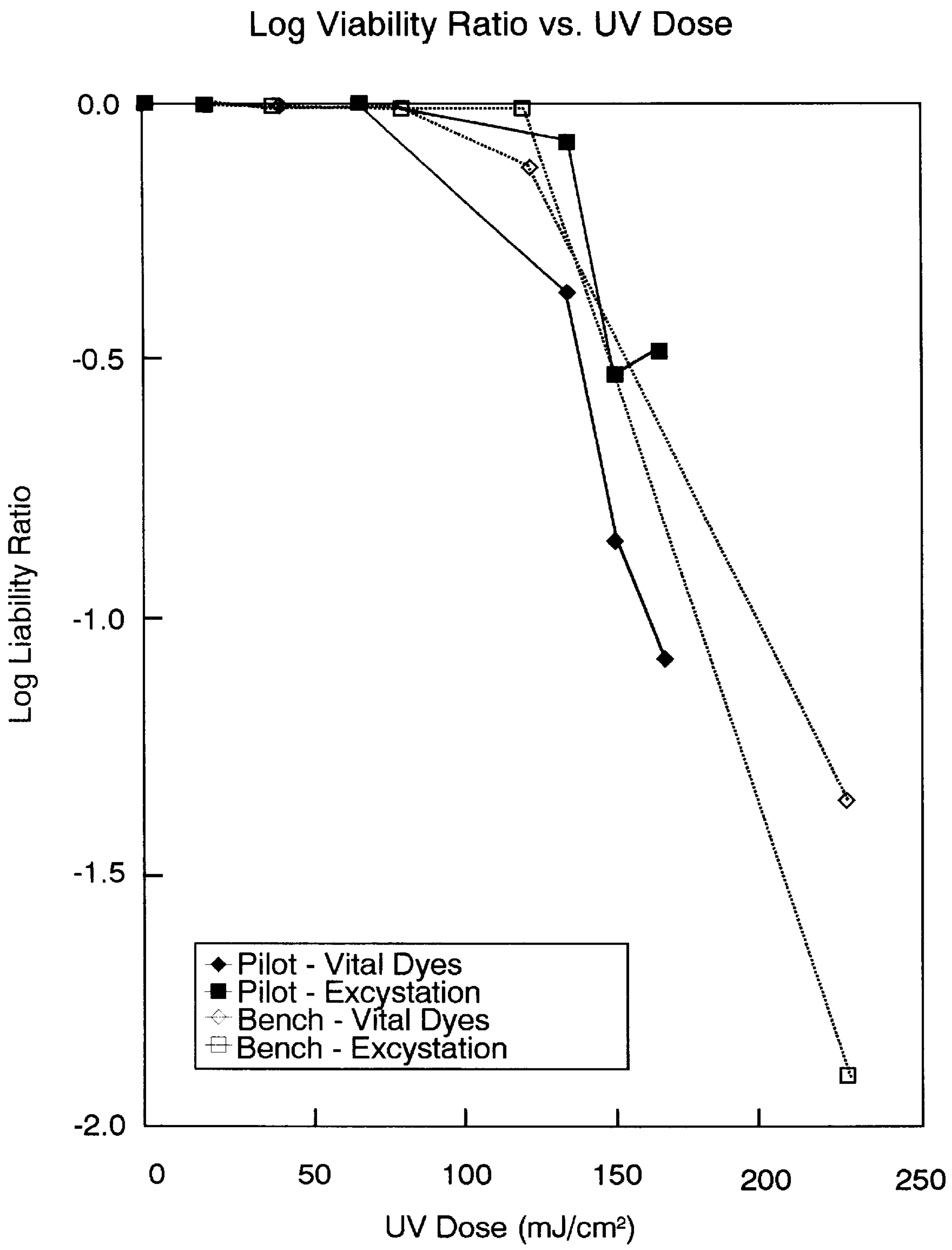
FIG. 2 is a chart that shows the correlation between bench scale and pilot tests.

Pilot test challenges of *Cryptosporidium parvum* and *Giardia muris* were carried out on a 111 L (29.4 gal) UV reactor containing 6×1 kW Rayox medium pressure UV lamps mounted horizontally across a tower type reactor. The organisms were introduced upstream of a static mixer ahead of the reactor and collected on 1 micron filters after the reactor. The overall flow rate during the test was about 215 gpm (814 L/min). The organisms were extracted from the filler and concentrated. Four of the Crypto samples were fed to mice. Part of the concentrate was retained for in vitro tests.

The UV doses were calculated from the average irradiance (determined from a sophisticated mathematical model of the reactor) times the residence time in the reactor (about 8.3 s). The dose was varied by turning one or two lamps on and at low or high power.

Summary of Results

In Vitro Assays

Two In vitro assays were used: vital dyes and excystation. The process control mean viability values were determined to be 71.7% by the vital dyes assay. The factor necessary for normalizing these viability values to 100% was calculated by dividing 100 by 71.7=1.39. Following oocyst exposure to various NV doses, their actual viability values were determined (Table 1) and then normalized by multiplying each viability value with the calculated factor (1.39). Similarly, Cryptosporidium and Giardia process control excystation values were normalized to 100% and their respective normalization factor was used to adjust the actual excystation values for UV exposed organisms. These results are calculated as the percentage viability for a UV test divided by the percentage viability for the process control. By doing the above, the viability factors (percent) for in vitro tests changes to those presented in the table below.

Viability Factors (percent) for In Vitro Tests

| | *Cryptosporidium parvum* | | *Giardia muris* |
|---|---|---|---|
| UV Dose (mJ/cm$^2$) | Vital Dyes | Excystation | Excystation |
| 20 | 113 ± 36 | 145 ± 38 | 174 ± 14 |
| 69 | 110 ± 34 | 176 ± 38 | 103 ± 48 |
| 137 | 37 ± 17 | 83 ± 21 | 68 ± 32 |
| 152 | 13 ± 14 | 29 ± 31 | 31 ± 13 |
| 167 | 8 ± 7 | 33 ± 10 | 33 ± 8 |

Note, any values over 100% should be considered to be 100%.

Log Reductions for the *Cryptosporidium parvum* Mouse Infectivity Tests

| UV Dose (mJ/cm$^{2)}$ | Log Reduction |
|---|---|
| 20 | 3.9 |
| 69 | ▸4.5 |
| 167 | ▸4.5 |

Detailed Analysis of Data

TABLE 1

In Vitro Tests of UV exposure on *Cryptosporidium parvum* and *Giardia muris* viability.

| | Cryptosporidium parvum viability (n = 3) | | | *Giardia muris* viability (n = 3) | |
|---|---|---|---|---|---|
| Testing Parameters | UV Dose (mJ/cm$^2$) | Vital Dyes | Excystation | (mJ/cm$^2$) | Excystation |
| Test-30/3/98 | | | | | |
| Trip Control 1 | | 82.0 ± 4.0 | 81.4 ± 8.1 | | 90 ± 7.1 |
| Process Control- | | 71.7 ± 15.4 | 29.7 ± 1.1 | | 53.2 ± 21.5 |
| No UV | | 61.7 ± 4.9 | 45 ± 7* | | |
| Test-31/3/98 | | | | | |
| Trip Control 2 | | 90.4.6 ± 1.2 | 79.8 ± 4.3 | | 97.3 ± 2.5 |
| UV Test | 167 | 4.9 ± 4.5 | 13.7 ± 3.1 | 167 | 19.9 ± 2.7 |
| Test-01/04/98 | | | | | |
| Trip Control 3 | | 88.7 ± 1.0 | 56 ± 9.8 | | 100 ± 0 |
| | | | 89 ± 2.7* | | |
| UV Test | 69 | 73.6 ± 4.1 | 72.7 ± 2.3 | 67 | 55 ± 13 |
| Test-06/04/98 | | | | | |
| Trip Control 4 | | 76.6 ± 4.4 | 80.4 ± 1.7 | | 99 ± 1 |
| UV Test | 152 | 8.5 ± 1.4 | 12.1 ± 1.5 | 152 | 23 ± 9.6 |
| Test 07/04/98 | | | | | |
| Process Control 2- | | 45.3 ± 16.8 | 49.3 ± 4.0 | | 96.7 ± 1.2 |
| No UV | | | | | |
| UV test | 137 | 25 ± 8.9 | 34.3 ± 4.0 | 137 | 36.4 ± 9.1 |
| Test 08/04/98 | | | | | |
| Trip Control 5 | | 79.7 ± 5.1 | 77.3 ± 4.2 | | 94.7 ± 3.1 |
| UV Test | 20 | 75.3 ± 6.8 | 47 ± 7.8 | 21 | 92.7 ± 1.2 |
| | | | 72.7 ± 1* | | |

TABLE 2

Effects of UV exposure on *Cryptosporidium parvum* oncyst infectivity.

| Testing Parameters | UV Dose (mJ/cm$^2$) | *Cryptosporidium parvum* Infectivity Inoncula 1 | Inocula 2 | Inocula 3 |
|---|---|---|---|---|
| Trip Control 1 | | | | |
| Inocula delivered per mouse | | 25 | 75 | 150 |
| % Infected (#/total) | | 5.3%(2/28) | 35%(14/40) | 62.5%(15/23) |
| Process Control 1 | | | | |
| Inocula delivered per mouse | | 50 | 500 | 5,000 |
| % Infected (#/total) | | 44%(11/15) | 100%(20/20) | 100%(23/23) |
| UV Test 31/03/98 | | | | |
| Inocula delivered per mouse | | 1,000 | 10,000 | 100,000 |
| % Infected (#/total) | 191 | 0%(0/24) | 0%(0/12) | 0%(0/24) |
| UV Test 01/04/98 | | | | |
| Inocula delivered per mouse | | 1,000 | 10,000 | 100,000 |
| % Infected (#/total) | 79 | 0%(0/22) | 0%(0/26) | 0%(0/25) |
| UV Test 08/04/98 | | | | |
| Inocula delivered per mouse | | 1,000 | 10,000 | 100,000 |
| % Infected (#/total) | 23 | 0%(0/18) | 0%(0/18) | 4.5%(1/22) |

While a presently preferred embodiment of the invention has been described in particularity, the invention may be otherwise embodied within the scope of the appended claims.

What is claimed:

1. A method for the prevention of *cryptosporidium oocysts* comprising irradiating water with a continuous broad band of ultraviolet light in doses of from about 10 mJ/cm$^2$ to about 175 mJ/cm 2.

2. A method as set forth in claim 1 wherein said broad band is a frequency of 200 to 300 nm using an UV lamp.

3. A method as set forth in claim 1 or 2 wherein said dose is about 20 mJ/cm$^2$ to about 30 mJ/cm$^2$.

4. A method as set forth in claim 1 wherein said broad band is a frequency of 200 to 300 nm using a medium pressure UV lamp.

* * * * *

UNITED STATES PATENT AND TRADEMARK OFFICE

CERTIFICATE OF CORRECTION

PATENT NO. : 6,129,893 Page 1 of 1
DATED : October 10, 2000
INVENTOR(S) : James R. Bolton et al.

It is certified that error appears in the above-identified patent and that said Letters Patent is hereby corrected as shown below:

Title page,
Item [75], Inventors, should read -- James R. Bolton, Aye, Canada; R.D. Samuel Stevens, Moon Township, PA; Bertrand W. Dussert, Cherry Hill, NJ. --

Signed and Sealed this

Nineteenth Day of July, 2005

JON W. DUDAS
*Director of the United States Patent and Trademark Office*